Dec. 12, 1939.                R. HOFER                  2,183,260
                    PHASE DISPLACEMENT DETECTOR
                       Filed April 16, 1937
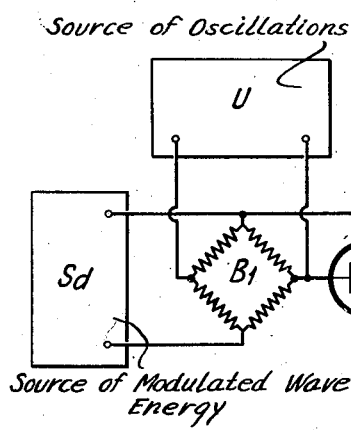
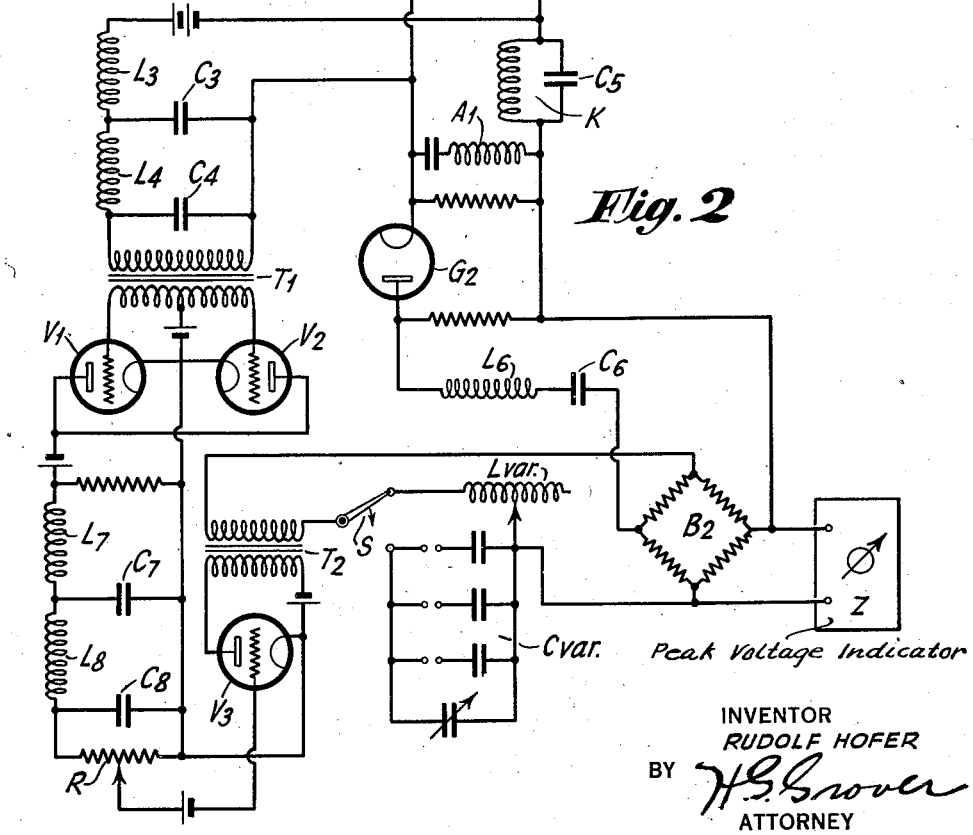
INVENTOR
RUDOLF HOFER
BY H.S. Grover
ATTORNEY Patented Dec. 12, 1939

2,183,260

UNITED STATES PATENT OFFICE 2,183,260

PHASE DISPLACEMENT DETECTOR

Rudolf Hofer, Berlin, Germany, assignor to Telefunken Gesellschaft für Drahtlose Telegraphie m. b. H., Berlin, Germany, a corporation of Germany Application April 16, 1937, Serial No. 137,164
In Germany April 9, 1936

3 Claims. (Cl. 172—245)

This invention involves a new and improved means for determining the phase position of side band oscillations.

This invention relates to an arrangement for measuring the relative phase position between a high frequency carrier and the resultant of the side bands appearing at modulation of the carrier.

As is known in all types of modulation the oscillations can be divided into a carrier and two sidebands. The only difference between amplitude modulation and frequency modulation resides in that in case of amplitude modulation the resultant of the sideband oscillations is in phase with the carrier oscillation, whereas in the case of frequency modulation it is in 90° phase displacement therewith. In the general case the resultant of the side bands has any phase displacement with respect to the carrier, the degree of this displacement determining the relative amounts of amplitude and frequency modulation of the wave. Furthermore, the amplitudes of the side bands are generally different and unsymmetrical with respect to the carrier.

Methods have been proposed to measure the amplitude of the side bands of modulated oscillations. The simplest way of doing this is by means of a superheterodyne system operated in accordance with the following method: An auxiliary oscillation of constant amplitude is superimposed on the modulated oscillation to be investigated, and the frequency of the auxiliary oscillations is so varied that when it is beat in a detector with a selected side band the amplitude of which is to be measured a difference frequency $d$ is obtained. This demodulated oscillation of the frequency $d$ is filtered out with the aid of a selective amplifier so that the deviation of a measuring instrument arranged in the output circuit of the amplifier furnishes a relative measure of the oscillation amplitudes to be measured. In this manner a symmetry of the amplitudes of the two side band components can be ascertained. Since, however, the phase position of the side band oscillations with respect to the carrier remains unknown, this method is not sufficient for determining whether amplitude or frequency modulation is involved.

Hitherto means have not been known by which measurement of the amount of frequency modulation of an amplitude modulated wave could be solved in a simple manner.

In accordance with the invention the phase position of the resultant of the side bands with respect to the carrier, and hence the type of modulation is determined by superposing or impressing on the transmitter oscillation to be investigated of carrier frequency $h$, oscillatory energy with the frequency $h+d$, or $h-d$, and the entire oscillation mixture is twice demodulated and the difference oscillation $d$ obtained from the first demodulation is compared as to phase with the combination oscillation $2d$ obtained from the second demodulation.

The invention has been illustrated in the drawing, wherein;

Figure 2 shows a wiring diagram of the sideband phase comparing circuit of the present invention; while Figure 1 is a vector diagram illustrating the operation of my invention.

Figure 1 shows the vector diagram of a carrier with the amplitude T and frequency $h$, and of two side bands with the amplitudes $S_1$ and $S_2$, the frequencies $h-n$ and $h+n$ and phase displacement $\varphi_1$, and $\varphi_2$ with respect to the carrier, and finally the oscillation to be superimposed with the amplitude U and the frequency $h+d$. It is assumed that at the time $t=0$ the carrier oscillation and the heterodyning oscillation have no phase displacement. The total oscillation G is defined by the expression:

$$G = Te^{iht} + Ue^{i(h+d)t} + S_1 e^{i[(h-n)t+\varphi_1]} + S_2 e^{i[(h+n)t+\varphi_2]}$$

Hereby the values $\varphi_1$ and $\varphi_2$ may be positive or negative. U may be chosen substantially higher than T, $S_1$ and $S_2$. Then, if $p_1$ represents the factor of proportionality of the detection and if $n$ is greater than $d$ there will be obtained substantially after the first detection the following difference oscillations:

1. $p_1 UT e^{idt} = P_1 =$ an oscillation
2. $p_1 US_1 e^{i[(n+d)t-\varphi_1]}$
3. $p_1 US_2 e^{i[(n-d)t-\varphi_2]}$ If the last two oscillation are again applied to a detector, then if $p_2$ represents the factor of proportionality of the second detection there will be obtained the difference oscillation:

$$p_2 p_1^2 U^2 S_1 S_2 e^{i[2dt-(\varphi_1+\varphi_2)]} = P_2 = \text{another oscillation}$$

If, following the first demodulation, the oscillation $P_1$ is filtered out without phase turning, from the oscillation mixture, and when comparing its phase position with that of the octave $P_2$ obtained from the second detection, the unsymmetry of the phase namely $\varphi_1+\varphi_2$ of the modulated oscillation can be determined, since the sum of the phase angles of each side band remains constant relative to the carrier. In order to determine the phase position of the resultant of the side bands the two oscillations $P_1$ and $P_2$ can be oscillographed in combination or separately by means of a loop, or cathode ray oscillograph. A loop oscillograph having two measuring loops may preferably be used whereby both oscillations can be simultaneously but separately oscillographed.

However, it is also possible to measure the phase position directly by means of an indicating instrument. Figure 2 shows the complete circuit of such an arrangement.

The oscillation to be investigated and which is modulated with a single sinusoidal tone is passed from the transmitter $Sd$ to a diagonal of a balanced bridge $B_1$. At the other diagonal points the local oscillator $U$ is placed. The frequency in the diagram shown $\phi_2$ is positive and $\phi_1$ is negative. The frequency mixture is modulated by the detector $G_1$ which may operate as a linear or quadratic detector. However, linear detectors are preferable in view of the fact that thereby demodulated oscillations with larger amplitudes can be obtained. The high frequency oscillations are withheld from the following detector and amplifier stages by means of the filter $C_1$, $C_2$, $L_1$. Moreover, the filter is so dimensioned that the phase position of the low frequency oscillation is not influenced. The difference oscillation of the frequency $d$ is applied to two amplifier tubes $V_1$ and $V_2$ across the choke chain $L_3$, $L_4$, $C_3$, $C_4$. This choke chain is closed by ohmic resistance for the frequency $d$, while the higher frequencies are held back. The tubes $V_1$ and $V_2$ connected in push-pull at the grid side, and in parallel at the anode side double the input frequency $d$. The doubling not required when using an oscillograph, serves for rendering the oscillations $P_1$ and $P_2$ equal, while originally their ratio was 1:2, so that in this way the phase position can be measured with the phase indicator described hereinafter.

The output of the tubes $V_1$ and $V_2$ is connected to a tube $V_3$ across a choke chain $L_7$, $L_8$, $C_7$, $C_8$, $R$ which permits the frequency $2d$ to pass through but withholds the higher harmonics, the output of said tube $V_3$ being applied to the balanced bridge $B_2$ across a transformer having practically no stray action. The other bridge diagonal receives the frequency $2d$ obtained from the original frequency mixture by detection in the detector $G_2$. The selective circuits $K$, $A_1$ serve for filtering out the frequencies $n+d$, and $n-d$ from the remaining frequency mixture and conducting $n+d$ and $n-d$ to the detector $G_2$. $K$ is a blocking circuit, $A_1$ a series circuit for the frequency $d$. However, for $n\pm d$, the impedance of $A_1$ is high as compared with that of $K$, and also as compared with the resistance $R_{a1}$, so that phase rotations are avoided. The frequency derived from the detector $G_2$ is again freed of undesirable frequencies and applied to the bridge $B_2$.

The two oscillations supplied to the bridge by $G_2$, and $V_1$, $V_2$ have the same phase at correct polarity, if $\theta_1+\theta_2=0$, and if the reactors $L_{var}$ and $C_{var}$ destined for the phase correction are not connected. $L_{var}$ and $C_{var}$ permit of varying the phase of the voltage coming from $V_3$ approximately by 180°. If the phase rotating action is gauged, the value of $\theta_1+\theta_2$ can be ascertained by determining the minimum deviation of a peak indicator $Z$ connected to one of the bridge resistors.

The measurement of the phase position could also be carried out following a further multiplication of the frequencies. The phase varying arrangement $L_{var}$ and $C_{var}$ is only schematically shown and can be substituted by any of the known phase rotation arrangements.

The entire circuit shown in Figure 2 is but an example of an embodiment of the idea of the invention, residing in superimposing on the oscillation to be investigated an auxiliary oscillation, and in comparing as to phase the frequencies produced after demodulating twice, this comparing being carried out eventually following a frequency multiplication of one or both oscillations. Since the phase of the one frequency thus produced is equal to the carrier phase, while the phase of the other frequency is equal to the phase of the side band frequencies, the type of modulation can be determined in this way. In order that beyond this, the values of the side band amplitudes may also be determined with the described arrangement, it would again be necessary, as above stated, that the heterodyning frequency be so varied at constant amplitude, that it forms with the individual frequencies of the transmitter in succession the difference frequency $d$. When shutting off the detector $G_2$, the relative value of the side bands with reference to the carrier can be seen at the instrument $Z$, if the detector $G_1$ and the amplifier tube $V_3$ operate in a linear fashion, or their non-linearity was previously determined and gauged.

The means for filtering out certain frequencies and selecting others shown in the circuit become simpler, the greater the difference between modulation note $n$ and difference note $d$. Usually it will be desirable that the modulation type be determined at low, as well as, at high modulation frequencies. In the broadcasting wave range, frequencies below 1000 cycles are considered low frequencies, since the unsymmetry entailed by the detuning of the high frequency circuits, still remains small. Thus, for the measurement 500 cycles may for instance be chosen as the lowest modulation frequency. When choosing the difference frequency $d$ correspondingly low for instance 50 cycles, the selection becomes very simple.

Small incidental variations of the carrier frequency could jeopardize the measurements, since in this case the frequency $d$ varies greatly in proportion, and the filtering means cause phase rotations, so that the measurement will be falsified. In this case, this drawback can be overcome by producing the heterodyning frequency by modulating an oscillation derived from the (non-constant) control stage of the transmitter to be investigated. The oscillation $h$ is modulated with such a high tone frequency $m_1$ that one side band can be rather easily filtered out. Now the frequency $h\pm m_1$ is again modulated by the note $m_2$ and the side band $h\pm m_1\pm H_2$ filtered out. If $m_1-m_2$ is equal to $d$, the said frequency can be utilized for heterodyning. If the oscillators of $m_1$ and $m_2$ are constant, the heterodyne will follow occasional frequency variations of the transmitter so that the difference frequency remains constant.

I claim:

1. In apparatus for determining the phase relation of a modulated carrier and its sideband frequencies to thereby determine the type of modulation of said carrier, means for combining the modulated carrier with an unmodulated wave of arbitrary frequency to produce a difference frequency beat note between the unmodulated wave and each component frequency of the modulated carrier, means for selecting the beat notes between the unmodulated wave and the sideband frequencies of the modulated wave, means for combining the said beat notes to form oscillatory energy whose frequency is twice the difference between the frequency of the unmodulated wave and the frequency of the modulated carrier and means for comparing the phase of the last named oscillatory energy with the phase of oscillatory energy derived solely from doubling the frequency of the difference frequency beat between the unmodulated wave and the carrier wave.

2. In apparatus for determining the phase relation of a modulated carrier wave and the resultant of its sideband frequencies to thereby determine the type of modulation of said carrier wave, means for combining and rectifying the modulated carrier wave with an arbitrary unmodulated wave to produce a difference frequency beat note between the unmodulated wave and each component frequency of the modulated carrier wave, means for producing beat notes between the arbitrary unmodulated carrier wave and the sideband frequencies of the modulated wave, means for combining and rectifying the same to form oscillatory energy whose frequency is twice the difference between the frequency of the unmodulated wave and the carrier wave frequency, and means for comparing the phase of the last named oscillatory energy with the phase of oscillatory energy of the same frequency derived solely from the difference frequency beat between the unmodulated wave and the carrier wave.

3. In apparatus for determining the relative phase of a modulated carrier wave and the resultant of its sideband frequencies to thereby determine the nature of the modulation of the carrier wave, means for beating said modulated carrier wave with an arbitrary unmodulated wave to produce difference frequency beat notes between the unmodulated wave and each component or sideband frequency of the modulated carrier, means for selecting the beats so produced between the arbitrary unmodulated wave and the sideband frequencies, means for combining the selected beats to form oscillatory energy whose frequency is twice the difference between the frequency of the unmodulated wave and the carrier wave frequency, means for producing oscillatory energy of a frequency equal to twice the difference between the arbitrary unmodulated wave frequency and the carrier wave frequency and means for comparing the phases of the last two produced oscillatory energies.

RUDOLF HOFER.